(12) United States Patent
Stokey et al.

(10) Patent No.: US 7,011,478 B2
(45) Date of Patent: Mar. 14, 2006

(54) SPADE DRILL INSERT HAVING HELICAL MARGINS

(75) Inventors: Timothy G. Stokey, Dover, OH (US); Greg Fiegl, Dover, OH (US); Joseph P. Nuzzi, Dover, OH (US); Wendell E. Mast, Dundee, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 61 days.

(21) Appl. No.: 10/780,273

(22) Filed: Feb. 17, 2004

(65) Prior Publication Data
US 2005/0100419 A1    May 12, 2005

Related U.S. Application Data

(60) Provisional application No. 60/518,205, filed on Nov. 7, 2003.

(51) Int. Cl.
*B23B 51/02* (2006.01)

(52) U.S. Cl. ................. 408/227; 408/233; 408/713

(58) Field of Classification Search ............. 408/144, 408/226, 227, 230, 231, 232, 233, 713
See application file for complete search history.

(56) References Cited

U.S. PATENT DOCUMENTS

| 1,221,247 | A | | 4/1917 | Traylor |
| 4,744,704 | A | * | 5/1988 | Galvefors .................. 408/144 |
| 5,452,971 | A | * | 9/1995 | Nevills ....................... 408/230 |
| 5,474,407 | A | * | 12/1995 | Rodel et al. ................ 408/227 |
| 5,599,145 | A | * | 2/1997 | Reinauer et al. ........... 408/233 |
| 5,649,794 | A | * | 7/1997 | Kress et al. .................. 408/83 |
| 5,904,455 | A | | 5/1999 | Krenzer et al. |
| 5,957,631 | A | | 9/1999 | Hecht |
| 5,957,635 | A | * | 9/1999 | Nuzzi et al. ................ 408/231 |
| 5,971,673 | A | | 10/1999 | Berglund et al. |
| 5,988,953 | A | | 11/1999 | Berglund et al. |
| 6,012,881 | A | | 1/2000 | Scheer |
| 6,371,702 | B1 | * | 4/2002 | DeWald et al. ............ 408/227 |
| 6,514,019 | B1 | * | 2/2003 | Schulz ......................... 408/59 |
| 6,551,036 | B1 | * | 4/2003 | Heule .......................... 408/227 |
| 6,685,402 | B1 | | 2/2004 | Mast et al. |
| 6,848,869 | B1 | * | 2/2005 | Stokey ....................... 408/227 |

FOREIGN PATENT DOCUMENTS

| DE | 94340 | | 9/1896 |
| DE | 42 39 311 | | 5/1994 |
| GB | 550306 | | 1/1943 |
| JP | 2000-84718 | * | 3/2000 |
| JP | 2001-9617 | * | 1/2001 |
| WO | 00/07761 | * | 2/2000 |

OTHER PUBLICATIONS

Tool and Manufacturing Engineers Handbook, Fourth Edition, vol. I, Machining, Society of Manufacturing Engineers, 1983, Chapter 9, pp. 14-15.*

* cited by examiner

*Primary Examiner*—Daniel W. Howell
(74) *Attorney, Agent, or Firm*—Hahn Loeser & Parks, LLP; Robert J. Clark (57) ABSTRACT

A spade drill insert and drilling tool assembly is provided wherein the lands of the spade drill insert have helical margins which provide increased stability during cutting operations. The margin may have a helical trailing side or leading side, a parallel helical margin, or may also include a gullet or flute adjacent the helical margin.

23 Claims, 6 Drawing Sheets

SPADE DRILL INSERT HAVING HELICAL MARGINS

TECHNICAL FIELD

This application claims the benefit of U.S. provisional patent application Ser. No. 60/518,205, filed Nov. 7, 2003, and is hereby incorporated by reference. The invention relates generally to a spade drill insert to be placed into a tool holder for boring holes into metals. More specifically, the invention relates to a spade drill insert having helical margins which provide increased stability during cutting operations.

BACKGROUND OF THE INVENTION

Drilling systems are frequently used to provide cylindrical holes in metallic workpieces. The cutting or boring action of the drill system may be carried out by an elongated, substantially cylindrical drilling tool, such as a combination of a tool holder and a spade drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of spade drill cutting inserts allows for quick changing of the insert upon wear of the cutting surfaces instead of the entire tool, and allows for one tool to be used for a variety of different boring applications by simply changing the insert and not the entire drill assembly.

Spade drill inserts are characterized in that they are generally flat having a pair of connection surfaces or faces on opposite sides of the insert that are parallel to each other and provide a register surface for the clamping arms of the holder. The leading end of the spade drill typically has a pair of transverse cutting edges in the form of an obtuse V. The trailing end or base of the spade drill insert is typically planar and perpendicular to the pair of connection surfaces and engages the bottom of the holder slot. The sides across the width of the insert, typically referred to as the lands, comprise the margin adjacent the leading connection surface and a clearance adjacent the trailing connection surface of the insert. The margin is cylindrically formed about the rotational axis of the spade drill and engages the sides of a hole that is being cut. The width of the margin is typically about one quarter to one third of the width of the insert and is formed parallel to the rotational axis of the spade drill on the cutting edge side of the width. The remainder of each side is the clearance surface which is radially inward of the margin such that it does not contact the hole being machined.

One problem with prior art spade drill inserts is that only a small radial portion of the width side is in contact with the hole which reduces the stability of the spade drill and may cause excessive exit chatter when cutting select materials. Another problem with some prior art spade drill inserts having large margins is that the margin surface area rubs against the side of the hole as the spade drill rotates which causes additional heat build up on the insert and may require reduced cutting speeds and may also shorten the life of the insert.

SUMMARY OF THE INVENTION

The spade drill of the present invention provides increased stability during drilling operations. This and other advantages are provided by a drill insert comprising a drill insert body having a first end opposite a second end, a first face side opposite and parallel to a second face side and a first land side opposite a second land side, the first and second land sides formed between the ends and the face sides; and a margin formed on a portion of each land side, the margin having a leading side and a trailing side, wherein at least one of the leading side and the trailing side is formed as a helix.

This and other advantages are also provided by a drilling tool assembly comprising a holder having a first end and a second end, wherein the second end comprises a shank portion adapted to be fixedly attached in a drilling machine, wherein the first end comprises a holder slot having a bottom seating surface over at least a portion of the holder slot and at least one attachment arm positioned on each side of the holder slot, wherein each attachment arm has at least one aperture formed therein; and a drill insert comprising a drill insert body having a first end opposite a second end, a first face side opposite and parallel to a second face side and a first land side opposite a second land side, the first and second land sides formed between the ends and the face sides, wherein the first side of the drill body is a generally planar surface, wherein the second side comprises at least two cutting edges formed transverse to each other, at least two apertures formed through each face side of the drill insert body, and a margin formed on a portion of each land side, the margin having a leading side and a trailing side, wherein at least one of the leading side and the trailing side is formed as a helix.

These and other advantages of the invention will be apparent as described below and in relation to the drawings.

BRIEF DESCRIPTION OF THE DRAWINGS

The invention and developments thereof are described in more detail in the following by way of embodiments with reference to the drawings, in which.

DETAILED DESCRIPTION OF THE INVENTION

Figure 1:
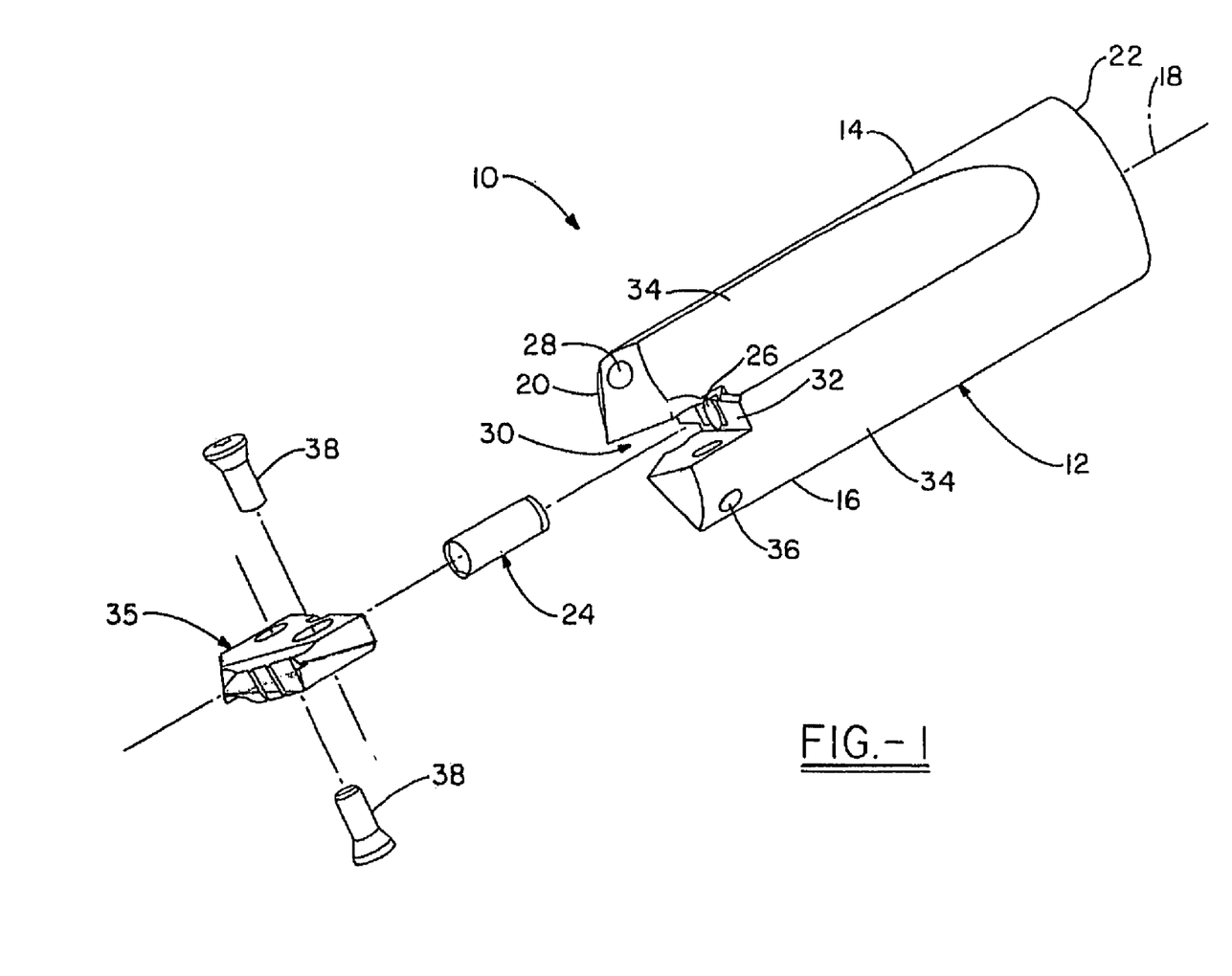
FIG. 1 is an exploded assembly view of the drill tool assembly according to a first embodiment.
Figure 2:
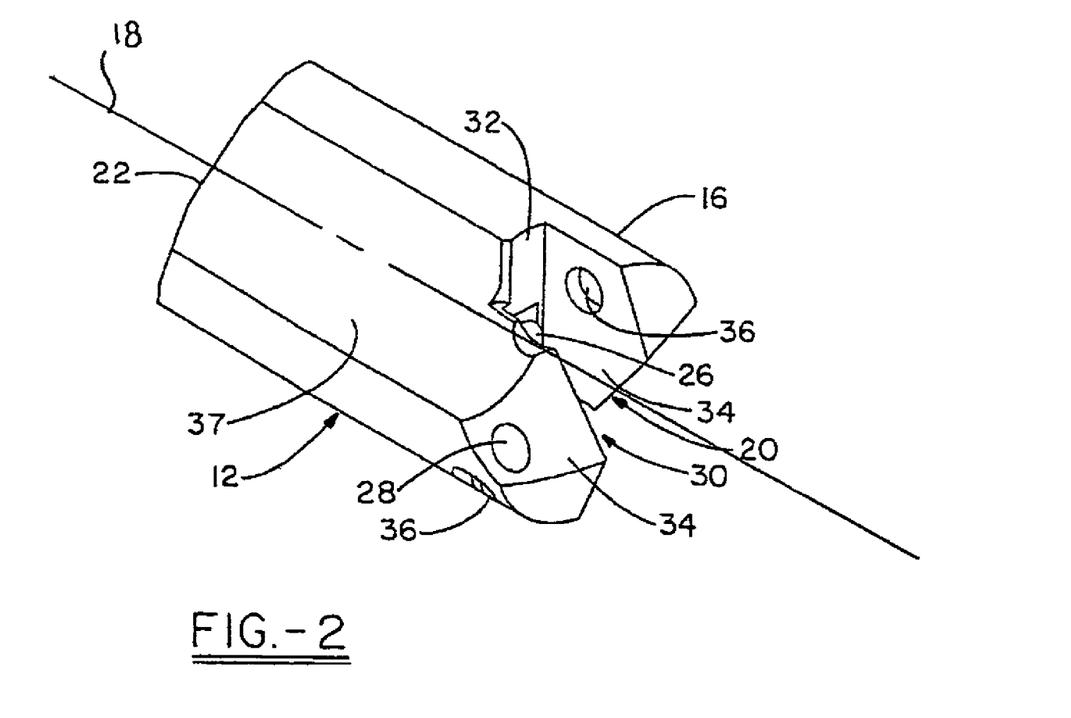
FIG. 2 is a partial perspective view of the holder associated with the assembly.

Turning now to a first embodiment of the invention, FIG. 1 illustrates a drill tool assembly 10 generally indicated. Drill tool assembly 10 comprises a holder 12, which has a body 14 and head portion 16 associated therewith. In the first embodiment, holder 12 has, in general, a cylindrical shape with a first end 20 and second end 22. As shown in FIG. 2, the first end 20 of holder 12 has a clamping or holder slot 30, which may extend across the entire diameter of the head portion 16 or, at least, over a center portion thereof at the general location of the rotational axis 18 of holder 12. The holder slot 30 has a bottom wall 32 positioned in substantially perpendicular orientation relative to the rotational axis 18 of the holder 12. In the embodiment shown, the assembly 10 may further include a locating boss or dowel pin 24, which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit relationship to position pin 24. Alternatively, the locating boss, which, in the embodiment shown, comprises pin 24, may be configured in another manner to achieve the corresponding functionality of pin 24, such as an integral member extending from bottom wall 32. Within the holder slot 30, a drill insert 35 is precisely positioned with respect to the holder 12 to perform the desired drilling function in conjunction therewith. As will be hereinafter described in more detail, the insert 35 has a point geometry comprising a plurality of cutting surfaces, which are precisely positioned with respect to the axis 18 of the holder 12 to minimize errors in a resulting drilling operation using assembly 10.

More particularly, the first embodiment of holder 12 is shown in FIG. 2, and may be configured to include at its first end 20 a pair of clamping arms 34, which extend about holder slot 30. The clamping arms 34 preferably include apertures 36, which accommodate screws 38 (see FIG. 1) to secure the drill insert 35 in its position within the holder slot 30. In the configuration shown, the holes 36 are threaded to engage screws 38, and mate with screw holes formed in the drill insert 35 in a predetermined manner to precisely locate the drill insert in a predetermined location within holder slot 30, as will be described in more detail. Each of the clamp arms 34 may also include a lubrication vent 28, which allows the application and flow of lubrication adjacent the cutting surfaces of the drill insert to facilitate the drilling operation. The clamp arms 34 may also include angled or curved surfaces, which facilitate chip removal via chip evacuating grooves 37 on each side of the holder 12. The seating surface 32 is also shown to be designed as a planar surface, which corresponds to the planar bottom portion of the drill insert 35, although another configuration of bottom surface 32 may be employed and is contemplated herein. It is contemplated that the drill insert 35 is made of a sintered metallic hard material such as carbide, cermet, ceramic, monocrystalline and polycrystalline diamond, or boron nitride. However, the drill insert 35 may also be comprised of high speed steel.

Turning to FIGS. 3A–3F, a first embodiment of the spade drill insert 35 is shown. The drill insert 35 comprises cutting edges 64 on its upper surface in the form of an obtuse V-shape, with cutting edges 64 on each side of the chisel 62 and radially outward from a web thin 63. The cutting edges 64 may include a plurality of cutting components such as chip breakers 66, which cooperate to provide the desired cutting surface for the material and/or drilling application. The insert 35 further comprises a pair of connection face surfaces 68, on opposite sides of the insert 35 that are parallel to each other and provide a register surface for the clamping arms 34 of the holder 12. The bottom 72 of the insert 35 is generally planar and perpendicular to connection surfaces 68. Bottom 72 also may include positioning slot 74 which cooperates with the pin 24 of the holder 12. The drill insert 35 may further comprise apertures 70 through connection surfaces 68, which cooperate with the apertures 36 in clamp arms 34 to secure insert 35 within holder slot 30 and seated against seating surface 32. Additionally, each of the apertures 36 and 70 are preferably formed with countersunk portions formed as a bearing surface adapted to be engaged by a corresponding tapered or like surface on the screws or other fastening mechanism 38. The enlarged clamping head of the screws 38 may be of any convenient shape, such as conical, ball-shaped, or in another form to correspond with the similar surfaces in the tool holder 12 and insert 35. In a typical fashion, by offsetting the axes of the apertures 36 and 70, upon securing insert 35 within slot 30 by means of screws 38, the insert 35 will be forced downwardly against the seating surface 32.

Figure 3A:
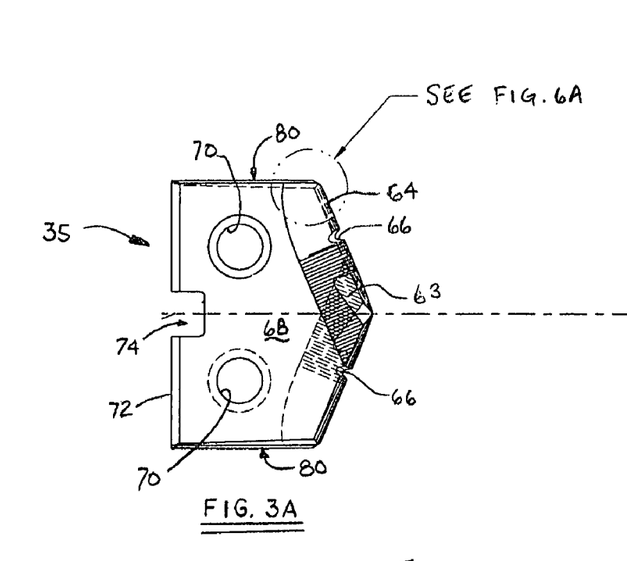
FIG. 3A is a front elevational view of an insert according to a first embodiment of the present invention having a helical margin.
Figure 3B:
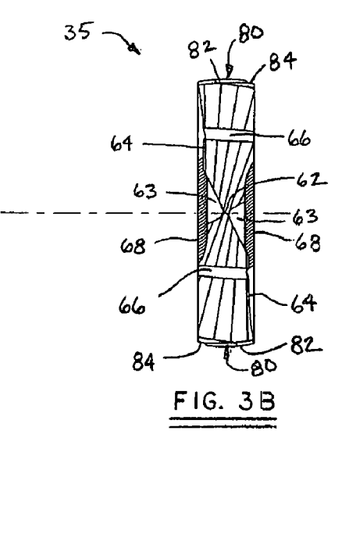
FIG. 3B is a leading end view of the insert of FIG. 3A.
Figures 3C, 3E:
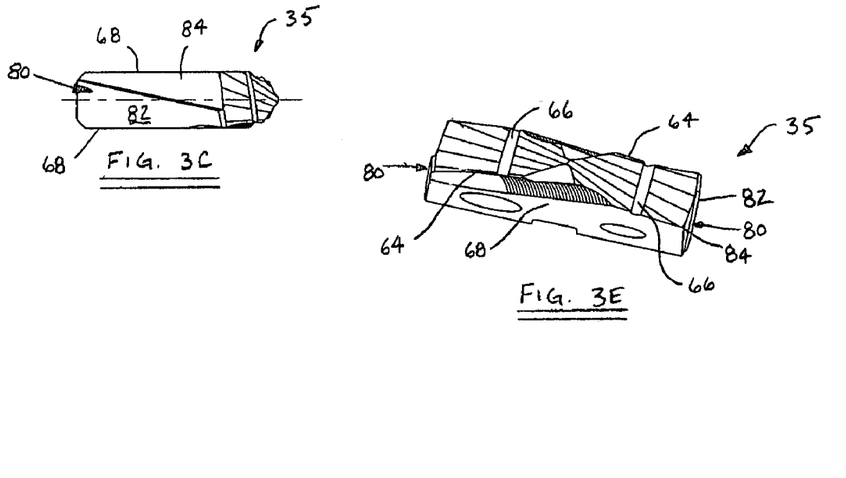
FIG. 3C is a side elevational view of the insert of FIG. 3A.
FIG. 3E is a perspective view of the leading end of the insert of FIG. 3A.
Figure 3D:
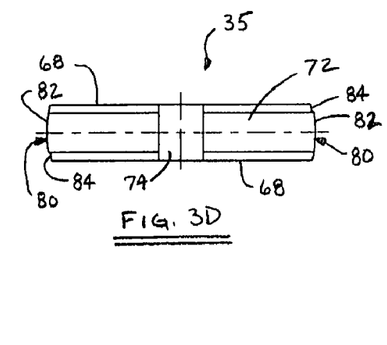
FIG. 3D is a trailing end view of the insert of FIG. 3A.

The drill insert 35 further comprises sides or lands 80 across the width of the insert 35, each side 80 comprising a helically extending margin 82 and a radially inward positioned clearance surface 84. The margin surface 82 is cylindrically formed about the rotational axis 18 of the insert 35 and contacts the edges of the hole being drilled. However—in contrast to prior art spade drill inserts, the trailing side of the margin 82 is helical wherein the margin width is helically increased from the cutting edge on one side of the spade drill insert 35 to the opposite side of the spade drill insert 35 as best shown in FIG. 3C. The helical margin 82 results in almost the entire radial width of the side 80 to be able to contact a hole as best shown in the top view of FIG. 3B. The helically extending margin 82 increases stability of the assembled tool 10 in operation by and helps prevent excessive exit chatter. While the spade drill insert of the first embodiment provides more stability, the increased surface area in contact with the hole may provide increased heat due to friction at the margin and may not be suitable in some applications.

Figure 4A:
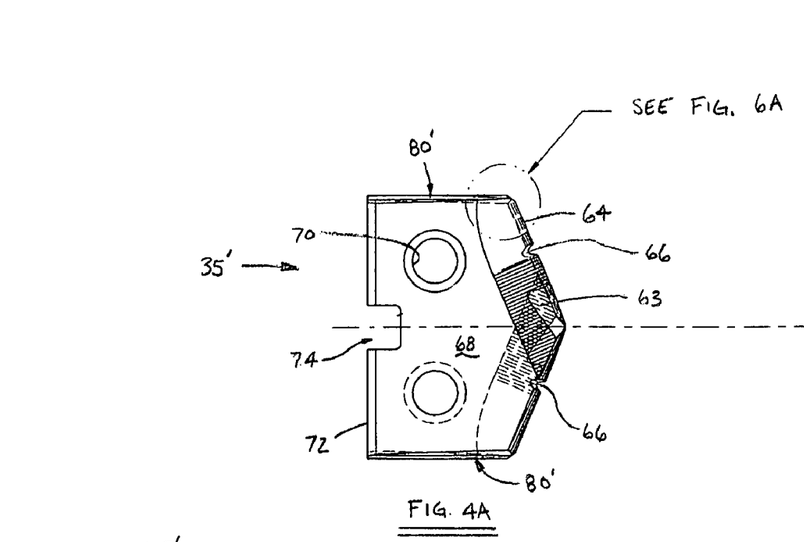
FIG. 4A is a front elevational view of an insert according to a second embodiment of the present invention having a parallel helical margin.
Figure 4B:
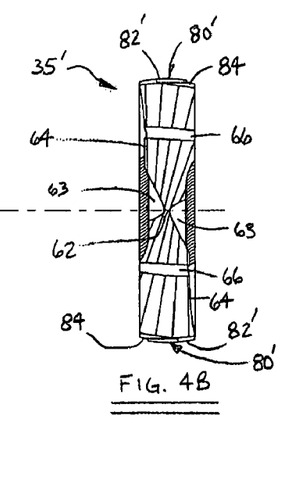
FIG. 4B is a leading end view of the insert of FIG. 4A.
Figure 4C:
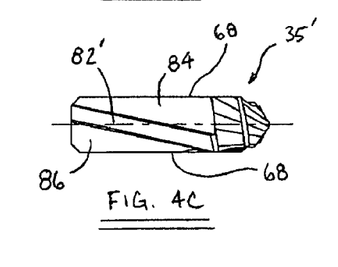
FIG. 4C is a side elevational view of the insert of FIG. 4A.
Figure 4D:
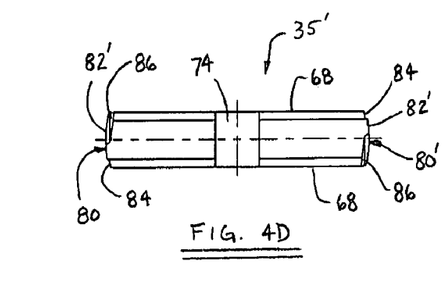
FIG. 4D is a trailing end view of the insert of FIG. 4A.
Figure 4E:
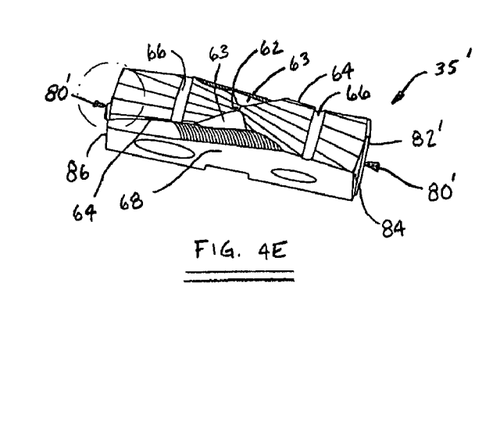
FIG. 4E is a perspective view of the leading end of the insert of FIG. 4A.
Figure 5A:
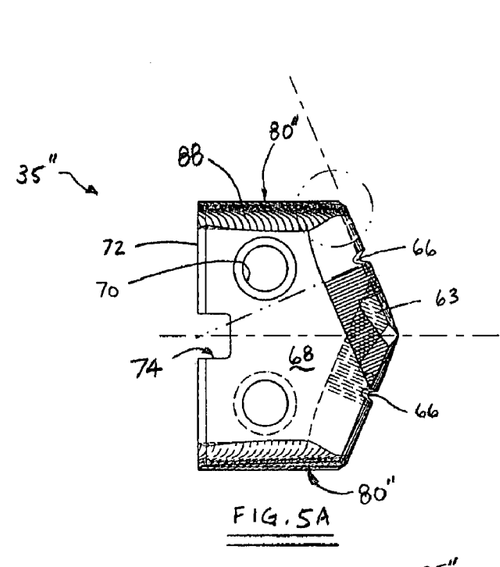
FIG. 5A is a front elevational view of an insert according to a third embodiment of the present invention having a parallel helical margin with a front relief gullet.
Figure 5B:
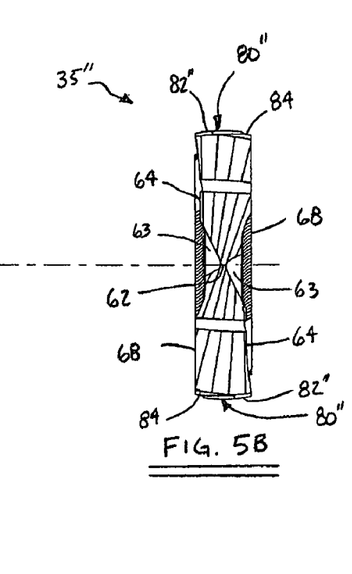
FIG. 5B is a leading end view of the insert of FIG. 5A.
Figure 5C:
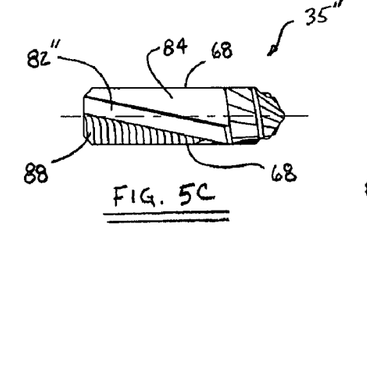
FIG. 5C is a side elevational view of the insert of FIG. 5A.
Figure 5D:
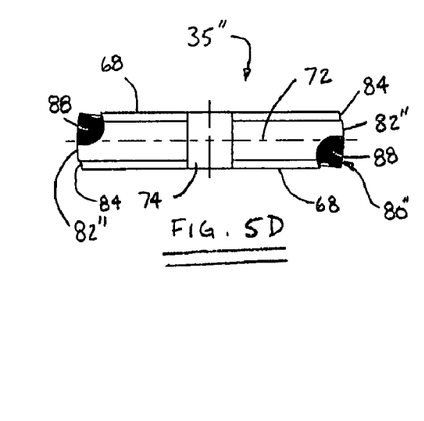
FIG. 5D is a trailing end view of the insert of FIG. 5A.
Figure 5E:
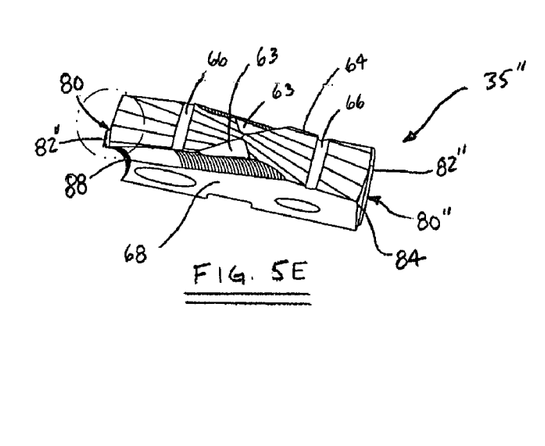
FIG. 5E is a perspective view of the leading end of the insert of FIG. 5A.

Referring now to FIGS. 4A–4E, in a second embodiment of the invention the spade drill insert 35' includes a parallel helical margin 82' wherein the leading side of the margin is also helical. The parallel helical margin 82' differs from the first embodiment in that a helical relief 86 has been added such that the margin width is maintained from the cutting edge on one side of the insert 35' to the back location on the other side of the insert 35' as best shown in FIG. 4C. The added helical relief 86 reduces the contact area between the insert 35' and the hole, which reduces the friction between the insert 35' and the hole, thereby reducing the operating temperature and allowing higher speeds (SFM) or penetration rates, and or increased tool life. The parallel helical margin 82' also results in almost the entire radial width of the side 80' to be able to contact with the hole as best shown in the top view of FIG. 4B. Therefore the drill insert 35' provides increased stability over that of prior art spade drill inserts. In addition, the margin width can be decreased from the prior art, which will decrease the amount of heat generated at the sides 80' of the insert which may further increase tool life and/or allow the tool to be run at a higher speed while maintaining tool life.

Referring now to FIGS. 5A–5E, in a third embodiment of the invention the spade drill insert 35" includes a parallel helical margin 82" having a helical flute or gullet 88 adjacent the margin 82". The gullet 88 may help channel chips out of the hole and may also help in chip formation. In addition, the gullet 88 will prevent chips from being trapped on the leading edge side of the helical margin as might be possible in some machining applications with the insert 35' of the second embodiment. The addition of the gullet 88 does not prevent the parallel helical margin 82" from contacting the hole over almost the entire radial width of the side 80" as best shown in the top view of FIG. 5B. This allows the insert 35" to retain the stability improvement provided by the previous embodiments. The gullets 88 may be positioned radially outward of the apertures 70 such that the standard connection is maintained. As with the previous embodiment, the margin width can also be decreased from the prior art, which will decrease the amount of heat due to friction generated at the sides 80" of the insert 35" which may further increase tool life and/or allow the tool to be run at a higher speeds while maintaining tool life.

Figure 6A:
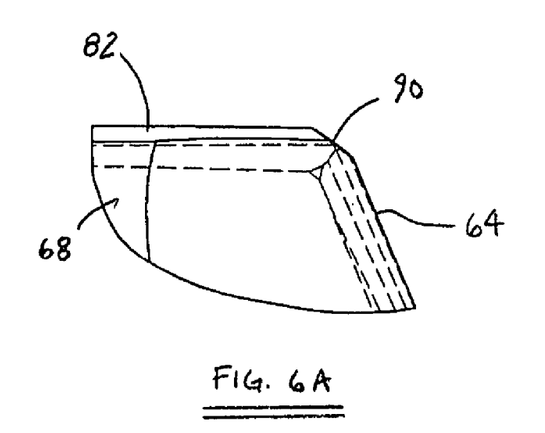
FIGS. 6A–6B are a partial plan view and a partial top view, respectively of a cam ground corner edge clearance associated with the present invention.
Figure 6B:
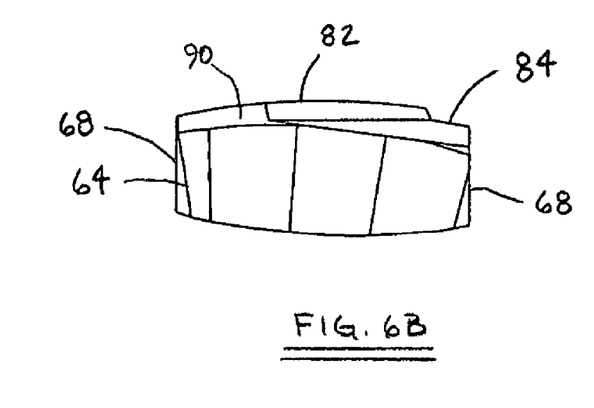
Figure 7A:
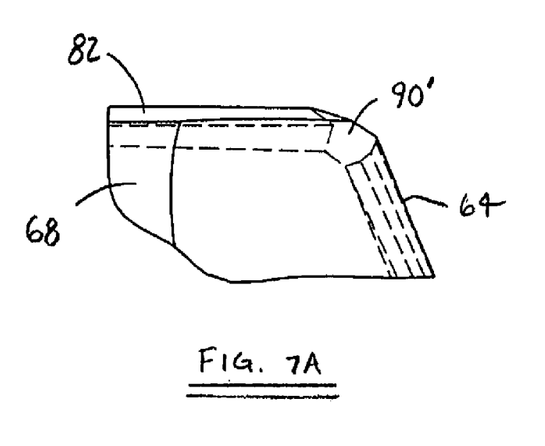
FIGS. 7A–7B are a partial plan view and a partial top view, respectively, of a corner clip corner edge clearance associated with the present invention.
Figure 7B:
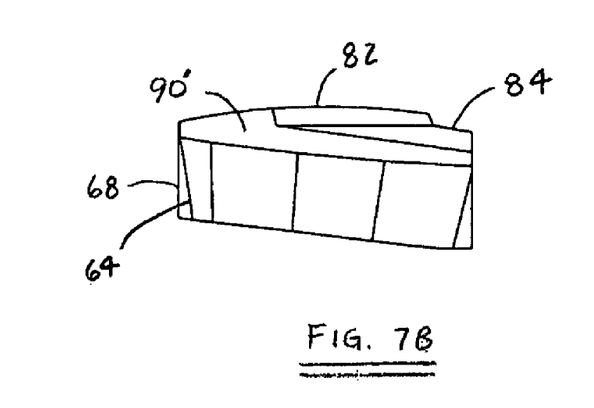

It is contemplated that the helical margin in conjunction with a flat style spade drill insert is not limited to the features shown on the spade drill inserts herein and that the helical margin may be used in conjunction with other specific types of spade drill insert geometries. Accordingly, the helical margin may be independent of the specific types of webs, lips, point clearances, corner clips, corner radii, etc., which may vary between different flat style spade drill inserts. For example, as shown in FIGS. 6A–7B, different types of corner treatments may be associated in a spade drill insert without limiting the helical margins. In FIG. 6A a partial plan view of the insert corner, and in FIG. 6B a partial top view of the insert corner, combine to show a cam ground corner clearance 90 on an insert having a helical margin. In FIG. 7A a partial plan view of the insert corner, and in FIG. 7B a partial top view of the insert corner, combine to show a second alternate corner clearance 90' on an insert having a helical margin.

While the above description has been presented with specific relation to particular embodiments of the invention, it is to be understood that the claimed invention is not to be limited as such and that certain changes may be made without departing from the scope of the invention with the above description intended to be interpreted as illustrative and not limiting.

What is claimed is:

1. A drill insert comprising:
    a drill insert body having a first end opposite a second end, a first face side opposite and parallel to a second face side, and a first land side opposite a second land side, the first and second land sides formed between the ends and the face sides; and
    a margin formed on a portion of each land side, the margin having a leading side and a trailing side, wherein the leading side of each margin is formed as a helix and a helical flute is formed adjacent the leading side of each margin.

2. The drill insert of claim 1, wherein the margin is formed with a constant arcuate width between the leading side and the trailing side such that both the leading side and the trailing side are formed as a helix.

3. A drill insert comprising:
    a drill insert body having a first end opposite a second end, a first face side opposite and parallel to a second face side, and a first land side opposite a second land side, the first and second land sides formed between the ends and the face sides; and
    a margin formed on a portion of each land side, the margin having a leading side and a trailing side, wherein the leading side of each margin is formed as a helix;
    wherein at least a portion of the each land side extends from the leading side of the margin to the corresponding face side of the insert body.

4. The drill insert of claim 1, wherein at least two apertures are formed through each face side of the drill insert body, and
    wherein the helical flutes are formed radially outward of the apertures.

5. The drill insert of claim 1, wherein the first end of the drill insert body is a generally planar surface having at least one recess formed in the first side.

6. The drill insert of claim 1, wherein the second end comprises at least two cutting edges formed transverse to each other.

7. The drill insert of claim 1, wherein the at least two cutting edges are curved.

8. The drill insert of claim 6 further comprises a chip breaker formed through each cutting edge.

9. A drill insert comprising:
    a drill insert body having a first end opposite a second end, a first face side opposite and parallel to a second face side, and a first land side opposite a second land side, the first and second land sides formed between the ends and the face sides, and a rotational axis; and
    a margin formed on a portion of each land side, the margin having a leading side and a trailing side, wherein the trailing side of each margin is formed as a helix and the leading side of the margin extends to the face side of the insert body such that the leading side of the margin and the trailing side of the margin form an acute angle equivalent to the helix angle.

10. The drill insert of claim 1, wherein the drill insert body is comprised of a sintered metallic hard material.

11. The drill insert of claim 1, wherein the drill insert body is comprised of a material selected from the group consisting of carbide, cermet, ceramic, monocrystalline and polycrystalline diamond, and boron nitride.

12. The drill insert of claim 1, wherein the drill insert body is comprised of high speed steel.

13. A drill insert comprising:
    a drill insert body having a first end opposite a second end, a first face side opposite and parallel to a second face side, and a first land side opposite a second land side, the first and second land sides formed between the ends and the face sides;
    wherein the first end of the drill body is a generally planar surface having at least one recess formed in the first side;
    wherein the second end comprises at least two cutting edges formed transverse to each other;
    at least two apertures formed through each face side of the drill insert body; and a margin formed on a portion of each land side, the margin having a leading side and a trailing side, wherein the leading side of each margin is formed as a helix and a helical flute is formed adjacent the leading side of each margin, wherein the helical flutes are formed radially outward of the apertures.

14. The drill insert of claim 13, wherein the margin is formed with a constant arcuate width between the leading side and the trailing side such that both the leading side and the trailing side are formed as a helix.

15. A drilling tool assembly comprising:
   a holder having a first end and a second end, wherein the second end comprises a shank portion adapted to be fixedly attached in a drilling machine, wherein the first end comprises a holder slot having a bottom seating surface over at least a portion of the holder slot and at least one attachment arm positioned on each side of the holder slot, wherein each attachment arm has at least one aperture formed therein;
   a drill insert comprising a drill insert body having a first end opposite a second end, a first face side opposite a second face side and a first land side opposite a second land side, the first and second land sides formed between the ends and the face sides, wherein the first end of the drill body is a generally planar surface, wherein the second end comprises at least two cutting edges formed transverse to each other, at least two apertures formed through each face side of the drill insert body, and a margin formed on a portion of each land side, the margin having a leading side and a trailing side, wherein the leading side of each margin is formed as a helix and a helical flute is formed adjacent the leading side of each margin.

16. The drilling tool assembly according to claim 15, wherein a fastening mechanism engages each aperture of the at least two apertures of the drill insert and a corresponding aperture of the at least one aperture in each clamp arm for securing the drill insert in position within the holder slot.

17. The drill insert of claim 13, wherein the at least two cutting edges are curved.

18. The drill insert of claim 13 further comprising a chip breaker formed through each cutting edge.

19. The drilling tool assembly according to claim 16, wherein the at least one aperture in each clamp arm is offset from the corresponding aperture in the drill insert at least to urge the drill insert against the bottom seating surface of said holder slot.

20. The drilling tool assembly of claim 15, wherein the holder includes at least one flushing channel.

21. The drilling tool assembly of claim 15, wherein the margin of the drill insert is formed with a constant arcuate width between the leading side and the trailing side such that both the leading side and the trailing side are formed as a helix.

22. The drilling tool assembly of claim 15, wherein the holder slot includes a locating boss extending from the bottom seating surface and the first end of the drill insert body has at least one recess which cooperates with the locating boss of the bottom seating surface to allow the insert to be seated against the bottom seating surface.

23. The drilling tool assembly of claim 15, wherein the helical flutes are formed radially outward of the apertures.

* * * * *